(12) United States Patent
Kuipers et al.

(10) Patent No.: US 8,819,409 B2
(45) Date of Patent: Aug. 26, 2014

(54) DISTRIBUTION SYSTEM AND METHOD FOR DISTRIBUTING DIGITAL INFORMATION

(75) Inventors: Christiaan Kuipers, Eindhoven (NL); Pim Theo Tuyls, Turnhout (BE)

(73) Assignee: Intrinsic ID B.V., Eindhoven (NL)

( * ) Notice: Subject to any disclaimer, the term of this patent is extended or adjusted under 35 U.S.C. 154(b) by 175 days.

(21) Appl. No.: 13/501,875

(22) PCT Filed: Oct. 20, 2010

(86) PCT No.: PCT/EP2010/065767
§ 371 (c)(1),
(2), (4) Date: Apr. 13, 2012

(87) PCT Pub. No.: WO2011/048126
PCT Pub. Date: Apr. 28, 2011

(65) Prior Publication Data
US 2012/0204023 A1 Aug. 9, 2012

(30) Foreign Application Priority Data

Oct. 21, 2009 (EP) .................................. 09173691

(51) Int. Cl.
*H04L 29/06* (2006.01)
*H04L 9/32* (2006.01)
*H04L 9/08* (2006.01)
*G06F 21/10* (2013.01)

(52) U.S. Cl.
CPC .................. *H04L 9/3278* (2013.01); *H04L 9/08* (2013.01); *G06F 21/10* (2013.01); *H04L 9/32* (2013.01); *H04L 9/3271* (2013.01)
USPC ............................ 713/150; 713/100; 380/255

(58) Field of Classification Search
CPC ................ G06F 2221/0755; G06F 2221/0753; G06F 21/10; H04L 9/08; H04L 9/3278; H04L 9/32; H04L 9/3271
See application file for complete search history.

(56) References Cited

FOREIGN PATENT DOCUMENTS

| WO | WO 2006/053304 | 5/2006 |
| WO | WO 2006053304 A2 * | 5/2006 |
| WO | WO 2009/024913 | 2/2009 |
| WO | WO 2009024913 A2 * | 2/2009 |

OTHER PUBLICATIONS

Guajardo et al. "Anit-counterfeiting, key distribution, and key storage in an ambient world via physical unclonable functions." Springer science. p. 19-41.*

(Continued)

*Primary Examiner* — Fikremariam A Yalew
*Assistant Examiner* — Kendall Dolly
(74) *Attorney, Agent, or Firm* — Nixon & Vanderhye, PC

(57) ABSTRACT

A distribution system and method for distributing digital information is provided, which has high recoverability from a security breach. The distribution system comprises a server (200) and a computing device (110). During an enrollment phase, the computing device obtains a first response from an integrated physically unclonable function (150) integrated in the computing device. The system comprises an enrollment module (130) for determining helper data from a decryption key and the first response to enable later reconstruction of the decryption key from the helper data and a second response obtained from the physically unclonable function. During a reconstruction phase, which occurs after the enrollment phase and typically after a security breach has occurred that revealed data and/or programming code of the computing device, the server may encrypt digital information using an encryption module (220) with a cryptographic encryption key corresponding to the decryption key.

17 Claims, 5 Drawing Sheets

(56) References Cited

OTHER PUBLICATIONS

International Search Report for PCT/EP2010/065767 mailed Jan. 25, 2011.
Written Opinion of the International Searching Authority mailed Jan. 25, 2011.

J. Guajardo et al., "Anti-Counterfeiting, Key Distribution, and Key Storage in an Ambient World via Physical Unclonable Functions", Information Systems Frontiers, A Journal of Research and Innovation, Oct. 23, 2008, vol. 11, No. 1, pp. 19-41.
Y. Dodis et al., "Fuzzy Extractors: How to Generate Strong Keys from Biometrics and Other Noisy Data", Internet Citation, Jan. 1, 2008, Retrieved from the Internet on Sep. 18, 2008, 47 pages.

* cited by examiner

DISTRIBUTION SYSTEM AND METHOD FOR DISTRIBUTING DIGITAL INFORMATION

This application is the U.S. national phase of International Application No. PCT/EP2010/065767 filed 20 Oct. 2010 which designated the U.S. and claims priority to EP 09173691.8 filed 21 Oct. 2009, the entire contents of each of which are hereby incorporated by reference.

FIELD OF THE INVENTION

The invention relates to a distribution system for distributing digital information comprising a server and a computing device, the server and computing device each comprising a communication module for communication between the server and the computing device, the server comprising an encryption module for encrypting the digital information with a cryptographic encryption key, the computing device comprising a decryption module for decrypting the encrypted digital information with a cryptographic decryption key corresponding to the encryption key, the system comprises a cryptographic key module for obtaining the encryption and decryption key.

The invention also relates to a distribution method for distributing digital information from a server to a computing device and a corresponding computer program product.

BACKGROUND OF THE INVENTION

Conditional access systems (CAS) are a well-known method of distributing valuable content to users. It is a system that allows a content distribution to a limited set of subscribers to the system. Content, in particular audio and/or video content is delivered, e.g. streamed, to the playing devices of subscribers of the conditional access system. The subscribers pay a fee in exchange for which they obtain access to the content. For example, users may be able to watch movies via the conditional access system before those movies are released on via other television channels.

The content in a conditional access system is typically transmitted in the form of an electronic signal, via, e.g., satellite, cable, antennas over the air, over a data network, etc. The signal comprises the content in encrypted form to prevent users who are not authorized subscribers to the system from accessing the content.

The encryption and decryption of signals in conditional access systems has been standardized by in the Digital Video Broadcasting (DVB) project as DVB Conditional Access (DVB-CA). This standard provides compatibility with different distribution mechanisms while leaving implementers of a CAS some freedom in how they implement the system's security.

A typical way of using DVB-CA in a conditional access system is described in the paper 'A Comparison between satellite DVB conditional access and secure IP multicast' by H. Cruickshank, M. P. Howarth, S. Iyengar, and Z. Sun. Published in the 14th IST Mobile and Wireless Communications Summit, poster, Dresden, Germany, 19-23 Jun. 2005. See in particular section II.

In the known CAS, a tuner portion of a set-top box receives an electronic signal. The signal comprises content in the form of an MPEG-2 stream, which is encrypted with a Control Word (CW), also known as session key. The control word is a cryptographic key, which encrypts part of the content. The control word is changed frequently, say every few seconds. In order to decrypt the content the set-top box needs access to the control words which were used for encrypting the currently received signal. The control words are sent to the set-top box in messages called Entitlement Control Messages (ECM). Inside the Entitlement Control Messages, there is a table with one or more control words. An ECM message is itself encrypted with a service key. The service keys are also updated regularly, though not as regularly as the control words, say every few months. The set-top box needs access to the service key, so that it may decrypt ECMs, so that it may obtain control words, so that it may decrypt the content stream. The service keys are sent to the set-top box in messages called Entitlement Management Message (EMM). An EMM is encrypted with a Smart card key.

The smart card key is provided to the set-top box in a smart card. If one wishes to attack the conditional access system one needs to obtain access to the smart card key, access to the algorithms used by the set-top box and/or smart card, and access to the encrypted content stream. Usually the encrypted content stream is available to many television owners even though they are not content subscribers. Moreover, at least part of the algorithms used in conditional access systems are known, e.g., from the standard described above. Accordingly, the security of the system resides in a large part in the security of the smart card key.

The EMM and/or ECM are typically embedded in the content stream. Alternatively, they may also be transmitted to the set-top box via another channel.

Although measures are taken in the smart card to reduce the risk of attackers obtaining the smart card key, it nevertheless happens that an attacker finds ways to obtain it. For example, an attacker may exploit programming errors present in the smart cards programming, to trick the smart card into revealing its data structures. The attacker can use an illegally obtained smart card key to watch content distributed over the content distribution network without authorization. Moreover, he could exacerbate the problem by sharing the smart card key with many others and thereby enabling them to watch content without authorization.

One possible solution to this problem is to store a secret update key on the smart card so that, after the smart card key is compromised, the server can send an update message encrypted with the update key. The update message comprises a new smart card key for replacing the compromised key. Moreover, the update message may comprise additional programming for improving the programming of the smart card in those places where its security contained problems which allowed the attackers access. After the update message has been processed by the smart card, the security is restored: A new smart card key is in use which is unknown to the attacker and problems that allowed the attack have been removed. Although an attacker may conceivably block the update message from reaching his smart card to avoid the update, this will not help him, since decrypting new content will require an updated card having the correct smart card key.

Unfortunately, it has occurred in practice that the security is comprised even further. Sometimes all of a smart card's programming and/or data stored therein is revealed to attackers, including possible update keys stored on the card. For content distributors this is particularly problematic. If they send an update message as above an attacker can intercept the message and emulate the card's behavior. If the message contained an updated smart card key, the attacker can obtain the updated smart key by performing all of the steps the card would have taken. The attacker knows what steps the card would take since he has access to its programming and all its data.

One possible way to deal with this situation is to send each subscriber of the system a new updated smart card. This solution requires the manufacture of a large number of smart cards, and is very costly.

It is a problem of known distribution systems that their security is vulnerable to disclosure of the card's programming and data.

SUMMARY OF THE INVENTION

It would be advantageous to improve the ability of distribution systems of digital information to recover from an attack on their security.

The distribution system for distributing digital information comprises a server and a computing device. The server and computing device each comprise a communication module for communication between the server and the computing device. The server comprises an encryption module for encrypting the digital information with a cryptographic encryption key and the computing device comprises a decryption module for decrypting the encrypted digital information with a cryptographic decryption key corresponding to the encryption key. The system comprises a cryptographic key module for obtaining the encryption and decryption key.

The computing device comprises an integrated physically unclonable function. The system comprises an enrollment module for determining helper data from the decryption key and a first response obtained from the physically unclonable function to enable later reconstruction of the decryption key from the helper data and a second response obtained from the physically unclonable function. The computing device comprises a reconstruction module for reconstructing the decryption key from the second response and the helper data.

The distribution system according to the invention has an improved ability to recover from an attack on its security. The computing device comprises a physically unclonable function (PUF). One of the properties of such a function is that they do not store data in the same way other storage modules of the computing device do. Instead of storing a predictable predetermined pattern, a PUF is embodied in a physical system, and its responses depend on essentially random elements in the physical system. An attacker who has obtained access to the programming and data stored in the PUF does not necessarily have access to the PUF. This feature is used with great effect here to allow secure communication between the server and the computing device even after a security breach has occurred that revealed data and programming of the computing device.

Before the breach occurs, the enrollment module determines helper data which allows the computing device, who has access to the PUF, to reconstruct a decryption key. After the breach, a server can use the encryption key that corresponds to the decryption key to send an update message. At the computing device, the decryption key is reconstructed by accessing the PUF to obtain a second response. The second response is combined with the helper data to obtain the decryption key. Note that there is no reason to store either the encryption or decryption at the computing device. Therefore, after the breach occurs an attacker does not obtain access to them. It may however happen that an attacker obtains access to the helper data. Having the helper data is however of no use to the attacker if he does not have access to the PUF. He may very well find computer instructions in the computing device's programming which instruct the computing device to obtain a second response, and to combine the helper data with it, but even though the attacker has all this detailed knowledge of the computing device, and even though he has access to the helper data he cannot obtain the decryption key. In other words, since the PUF is unavailable to the attacker, but is available to the computing device, the attacker cannot reconstruct the decryption key, but the computing device can. After the computing device has obtained the decryption key, he may decrypt and process the digital information. The digital information may comprise, e.g., an update message. The digital information could also comprise other information, for example, an EMM message. In the latter situation, the decryption key could play the role of the smart card key. The digital information could also comprise a key.

It is preferred to apply message authentication to the digital information, before sending it to the computing device. Message authentication can be done in different ways. Authentication can be provided with a digital signature, e.g. RSA, DSA, ECDSA etc. Authentication can be provided with a Message Authentication Code (MAC), such as HMAC, CBC-MAC, etc. For software updates, encryption is not strictly necessary if the software is not confidential.

The distribution system may be a distribution system for distributing digital content, such as audio and/or video content, information, such as news, software etc. The digital information may comprise one or more of the above. The digital information may also comprise a message for configuring the computing device. For example, the digital information may comprise an update key for replacing a cryptographic key used in the computing device's security. The computing device may be a computer, laptop, netbook, smart card, RFID tag, set-top box, mobile phone, electronic book device, etc. The computing device may also be an FPGA, DSP, USB token, SD Card, router. For example, the invention may be used to update the security of a smart card comprised in a mobile phone, e.g., to recover from an attack on a communications network data integrity. For example, the invention may be used to update the security of a pay-tv system, by sending an update, such as an updated key or updated software, to a computing device, which functions as a receiver for pay television programs; For example, by updating the security of a smart card comprised in the receiving computing device.

The server, may comprise a file server, database etc, and may be connected to the computing device through a data network, such as the Internet or an Intranet. The connection between computing device and server may be wireless, or partly so. More generally, the server may be any computing device suited for use in the distribution system for distributing digital information.

The reconstruction module may employ an error-correcting algorithm for using redundancy information comprised in the helper data to remove errors in the second response when compared with the first response. The encryption and/or decryption key may depend on the first response, e.g., it may be obtained by applying a hash function, such as SHA-1, to the first response. On the other hand, the encryption key may also be chosen at random. Other hash functions that may be used instead of SHA-1 include SHA2, SHA3 or hash functions based on block ciphers such as AES, SERPENT or DES, etc.

The computing device may be configured for sending the server an enrollment message. The enrollment message enables the server to establish an encryption key that can later be reconstructed by the computing device through using helper data that was constructed for the decryption key corresponding to the encryption key. The enrollment message is sent to the server before a breach in the computing device occurs. The message is preferably encrypted using an ephemeral key, for example, by executing a key negotiation between server and computing device, such as the Diffie-Hellman key exchange.

The system is used in an enrollment phase and a reconstruction phase. In the enrollment phase, the first response is obtained. The enrollment message is sent from the computing device to the server for giving the server access to an encryption key for which the corresponding decryption key can be reconstructed at the computing device. During the reconstruction phase, the computing device obtains a second response from the PUF and reconstructs the decryption key from the second response and the helper data.

The enrollment module and the cryptographic key module may be situated at different positions in the system. Two ways of placing these modules are preferred.

In a preferred embodiment, the computing device is configured for sending the server an enrollment message comprising the first response. The server comprises the cryptographic key module and the enrollment module and is configured to send the helper data to the computing device.

In this embodiment, the computing device does not need to have an enrollment module. This reduces the code size which is needed in the computing device. Especially, if the use of an enrollment module was not anticipated when the computing device was delivered to subscribers, but was later introduced in a software update, the space in the computing device for additional modules may be scarce. This situation may occur, e.g., with deployed smart cards. It is preferred that, before an actual breach has occurred such a software update comprises only the minimum amount of programming instructions. In this embodiment, the computing device need only obtain a response and send it to the server.

Moreover, in this embodiment the encryption key can be chosen by the server. The server can choose this key randomly avoiding the need of a random number generator at the computing device. Especially for resource-restrained devices, the entropy needed to select a random key can be scarce. The server could also select the encryption key based on other criteria. For example, the encryption key can be chosen the same for more than one computing device, say the same for all computing devices in a particular segment of the distributing system that can be accessed using broadcasting. The digital information could then be encrypted with the same key for all computing devices and broadcasted to them, thus reducing bandwidth.

In a preferred embodiment, the computing device comprises the cryptographic key module configured for selecting the encryption and decryption key, and the enrollment module, wherein the computing device is configured for sending the server an enrollment message comprising the encryption key.

Another possibility is to have the enrollment module in the computing device. This has the advantage that the enrollment response can be much smaller. Typically, the amount of bits in a PUF response is much larger than the number of bits in the encryption key, since one must take account for the errors which may be present in the PUF response. When the error rate of the PUF is larger than a few percent, the size of the needed PUF response can be substantially larger than the encryption key, say, 10 times larger. Moreover, in most content distribution systems the bandwidth available for sending messages from computing devices back to the server is restricted. The bandwidth from computing device to the server is often smaller than the bandwidth in the other direction. It is therefore an advantage to keep these messages as small as possible.

In a preferred embodiment, a memory of the computing device is used as the physically unclonable function, the memory comprising a plurality of writable memory locations each memory location having at least two possible logical states, and an input for receiving an activation signal so as to cause each of said memory locations to enter one of its possible logical states, the entered state being dependent on physical, at least partially random characteristics of said memory, and thereby generating a response pattern of logical states useful as the enrollment response and as the construction response.

Often a memory is already available on the computing device. Using, part of, such a memory as a PUF is a cost efficient way of improving the security of the computing device. Moreover, if the invention is used for computing devices that were later updated for use with the invention, e.g., using a software update, there is often no possibility of changing the hardware. In such a situation, use must be made of hardware elements which are already available and can be used as a PUF.

Examples of a memory of the computing device which may be used as the physically unclonable function include, SRAM, flip-flops, registers, and DRAM.

A computing device may also use a non-memory based PUF, e.g., a butterfly PUF, a coating PUF, an optical PUF, a delay-based PUF, an oscillator PUF, etc.

In a preferred embodiment, the computing device is embedded in a set-top box comprising a conditional access module, the conditional access module comprising a key storage for storing a content decryption key for use in decrypting encrypted content, wherein the digital information comprises a further content decryption key for replacing the content decryption key.

In a set-top box, the security of keys used for decrypting content distributed to the computing device is particularly important. Since such keys are valuable on the black market, these devices experience many concerted attacks. On the other hand, there is also price pressure on these devices which makes it desirable to use cost efficient measures. Since the invention can be performed with comparatively low cost, yet gives a tangible security increase, this combination is ideal for the field of set-top boxes.

In a preferred embodiment, the computing device is embodied in any one of a smart card, RFID tag and mobile phone. The computing device may also be embodied in any one of a USB token, PDA, Set-top box (STB), router, gateway, Digital signal processor (DSP), VOIP Phone, etc. The invention is well suited for situations wherein a security element is vulnerable to a complete read-out yet remains resistant against the attacker taking full control of the device. Attackers may want to run programs of their own devising on computing device, e.g., as part of the attack. Nevertheless, it is possible that a computing device has revealed all its secrets yet still resists an attacker's attempt to run its own programming.

Note, that there are several ways in which a device may reveal its content yet resist running hostile programming. First of all programming which is embodied in fixed hardware cannot be changed. So if all the functions that handle the PUF are stored in fixed hardware than it will not be possible to change those functions. Functionality that is not embodied in fixed hard can also be protected, for example through the use of digital signatures. For example, a computing device may comprise a read-only memory (ROM) storing the public key of a public-private key pair of a signature scheme. Messages such as software updates are provided by the server with a signature using the private key of a private-public key pair.

The computing device verifies the signature using the public key. If an attacker obtains the public key, he can verify the signature, yet he cannot create signatures for his own software. To create signatures he needs access to the private key, which key typically resides in the server and is inaccessible to him.

A further aspect of the invention concerns a distribution method for distributing digital information from a server to a computing device. The method comprising communicating between the server and the computing device, encrypting at the server the digital information with a cryptographic encryption key, decrypting at the computing device the encrypted digital information with a cryptographic decryption key corresponding to the encryption key, and obtaining the encryption and decryption key, wherein determining helper data from the decryption key and a first response obtained from a physically unclonable function integrated in the computing device to enable later reconstruction of the decryption key from the helper data and a second response obtained from the physically unclonable function, reconstructing at the computing device the decryption key from the second response and the helper data.

In a preferred embodiment of the distribution method for distributing digital information comprises sending a patch from the server to the computing device, the patch updating parameters of the computing device which determine a functionality of the computing device, the updated functionality comprising at least the functions of obtaining the first response from the integrated physically unclonable function, obtaining at the computing device a further response from the physically unclonable function and reconstructing the decryption key based on the further response.

A computing device which is currently deployed and is not configured for the invention may nevertheless comprise hardware elements which can be used as a PUF. For example, the start-up noise of an SRAM memory on the computing device may be used as a PUF. The start-up values of an SRAM memory on a computing device may be used as a PUF since they depend on the physical embodiment of the memory; furthermore, the start-up values repeat themselves with a sufficiently high likelihood after a further start-up of the SRAM memory, to allow correction using helper data. If the computing device allows updates to its functionality, e.g., through software updates, the device can be reconfigured for use with the invention. The software update modifies the programming of the computing device and provides it with the additional needed functions. This provides a fallback scenario in case the computing devices do get broken. In an embodiment, the update also provides the enrollment module. Note that instead of a software update it is also possible to send a bitstream update to update the configuration parameters of an FPGA embedded in the computing device.

The update, e.g. software updates, may be spread over multiple updates. For example, a first update configures the computing device to send the enrollment message. The first update may comprise the enrollment module, but the enrollment module may also be placed at the server, e.g., to preserve space in the computing device. Smart cards often have only limited resources, such as memory space.

The functionality that is needed for the reconstruction module may be comprised in a second update. The second update may overwrite the first update, to reduce the program code space in the computing device. This is possible since enrollment functionality is no longer needed in the reconstruction phase.

Note that the possibility of reconfiguring existing computing devices is particularly advantageous in situations where many computing devices have been deployed, e.g., delivered to customers, and where a breach of security has significant consequences, e.g., a high recovery cost. This situation occurs, for example, in the field of set-top boxes. For some content distributing systems, large numbers of computing devices, typically smart cards, have been deployed. If one of these cards were broken, large costs would be incurred to replace the cards. The invention provides a solution to this problem.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc.

The computer implemented method may comprise only one of the server and the computing device steps of a method according to the invention.

In a preferred embodiment, the computer program comprises computer program code means adapted to perform all the steps of a method according to the invention when the computer program is run on a computer. Preferably, the computer program is embodied on a computer readable medium.

A distribution system and method for distributing digital information is provided, which has high recoverability from a security breach. The distribution system comprises a server and a computing device. During an enrollment phase, the computing device obtains a first response from an integrated physically unclonable function integrated in the computing device. The system comprises an enrollment module for determining helper data from a decryption key and the first response to enable later reconstruction of the decryption key from the helper data and a second response obtained from the physically unclonable function. During a reconstruction phase, which occurs after the enrollment phase and typically after a security breach has occurred that revealed data and/or programming code of the computing device, the server may encrypt digital information using an encryption module with a cryptographic encryption key corresponding to the decryption key. The computing device comprises a decryption module for decrypting the encrypted digital information with the decryption key. The digital information may be used to send an update message to the computing device. Since, the decryption key need only be available at the computing device after the breach, it can recover even if data, such as a cryptographic key, or programming code of the computing device was revealed, and even if an attacker could eavesdrop on the encrypted digital information.

BRIEF DESCRIPTION OF THE DRAWINGS

The invention is explained in further detail by way of example and with reference to the accompanying drawings, wherein.

Throughout the Figures, similar or corresponding features are indicated by same reference numerals.

Figure 1:
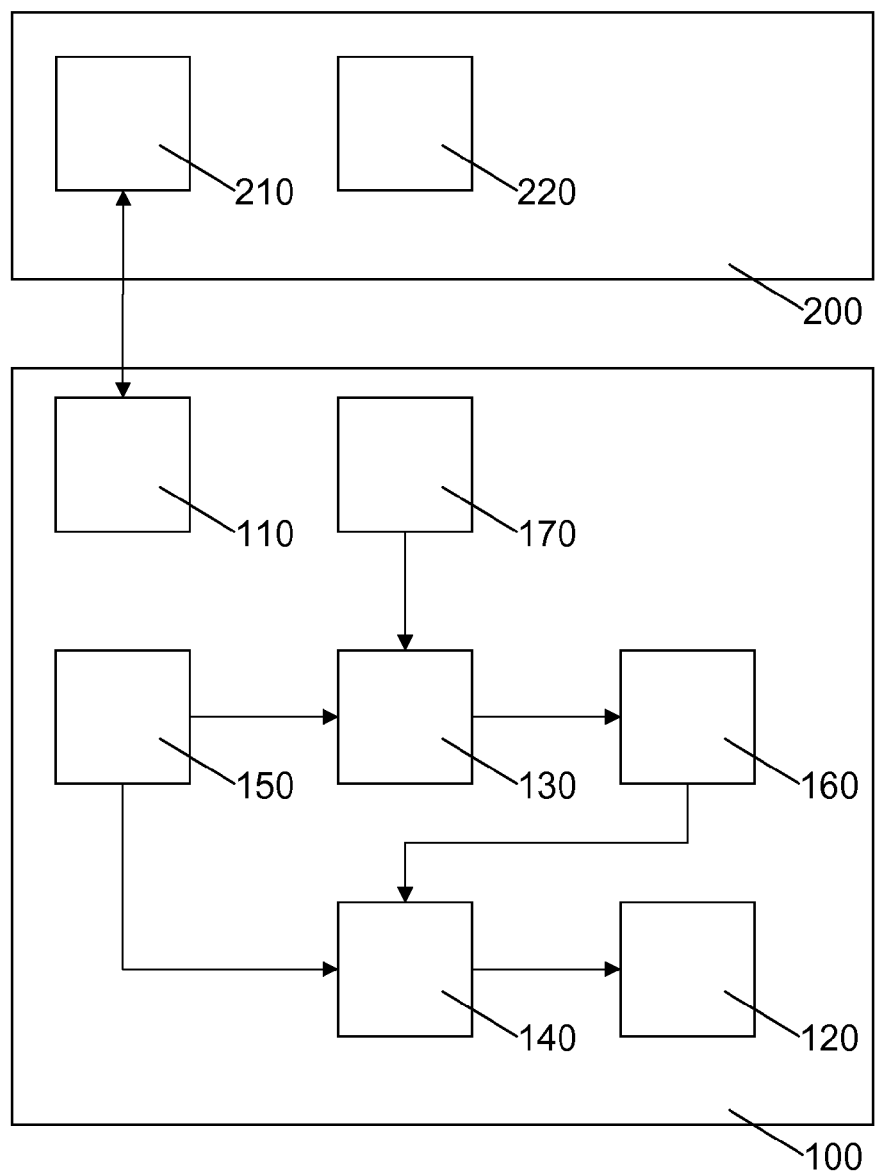
FIG. 1 is a block diagram illustrating a first embodiment of the distribution system for distributing digital information according to the invention.

LIST OF REFERENCE NUMERALS 100 a computing device
110 a communication module
120 a decryption module
130 an enrollment module
135 a first response module
140 a reconstruction module
150 a physically unclonable function
160 a helper data store
170 a cryptographic key module
200 a server
210 a communication module
220 an encryption module
230 an enrollment module
260 a helper data store
270 a cryptographic key module
310, 320 a distribution system for distributing digital information
400 a smart card
410 an integrated circuit
405 a card
420 a processing unit
422 a memory
424 a physically unclonable function
426 a communication element
430 a bus
510,520 a method of distributing digital information
510 sending a patch
520 obtaining an encryption and decryption key
530 obtaining a first response from a physical unclonable function
540 determining helper data from the decryption key and the first response
550 sending an enrollment message from the computing device to the server
560 encrypting at the server the digital information with a cryptographic encryption key
570 reconstructing at the computing device the decryption key from the second response and the helper data
580 decrypting at the computing device the encrypted digital information with a cryptographic decryption key corresponding to the encryption key

DETAILED EMBODIMENTS

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described.

Below a description is given of some of the elements of the invention, followed by a detailed description how those elements may be combined.

Physically Unclonable Functions

A Physical Unclonable Function (PUF) is a function which is embodied as a physical system, in such a way that an output of the function for an input is obtained by offering the input to the physical system in the form of a stimulus, and mapping the behavior that occurs as a result of an interaction between the stimulus and the physical system to an output. Wherein the interaction is unpredictable and depends on essentially random elements in the physical system, to such an extent, that it is unfeasible to obtain the output, without having had physical access to the physical system, and that it is unfeasible to reproduce the physical system. Preferably, a PUF is also easy to evaluate. For practical uses, PUFs are preferably low in manufacture costs.

Conventionally, an input or stimulus that a PUF accepts is called a 'challenge'. The output of a PUF, that is, the behavior the PUF exhibits after interaction with the stimulus, is called a 'response'. A pair comprising a challenge and the corresponding response of a PUF is called a challenge-response pair. Some types of PUFs allow a wide range of different inputs, some types allow a more limited range of inputs, or may even allow only a single input. Challenging a PUF with some single challenge may also be called an 'activation' of the PUF.

It would be most preferable, if a PUF when evaluated multiple times for the same challenge would produce multiple responses which are all equal. This property is not necessary though, and, in practice, most PUFs do not posses it. As long as the multiple responses lie sufficiently close to each other, the PUF can be usefully applied.

Since the interaction between a stimulus and the physical system cannot be predicted without access to the system, the PUF is hard to characterize and to model. The output of a particular PUF for an input can therefore only be obtained using the particular physical system underlying the particular PUF. Possession of a challenge-response pair is a proof that at some point the challenge was offered to the unique physical system that underlies the PUF. Because of this property, i.e., the property that challenge-response pairs are coupled to a unique physical device, a PUF is called unclonable. By equipping a device with a PUF, the device also becomes unclonable.

Physical systems that are produced by a production process that is, at least in part, uncontrollable, i.e., a production process which will inevitably introduce some randomness, turn out to be good candidates for PUFs.

One advantage of PUFs is that they inherently possess tamper resistant qualities: disassembling the PUF to observe its working, will also disturb the random elements and therefore also disturb the way inputs are mapped to outputs. Various types of PUFs are known in the art, including various types of electronic PUFs, including various types of PUFs based on electronic memories. PUFs may also be based on other concepts, e.g., optical PUFs. In an optical PUF the optical response is measured of an optically active system.

One way of constructing a PUF uses a static random access memory (SRAM); these PUFs are called SRAM PUFs. SRAMs have the property that after they are powered-up, they are filled with a random pattern of on-bits and off-bits. Although the pattern may not repeat itself exactly if the SRAM is powered-up a next time, the differences between two such patterns is typically much smaller than half the number of bits in the state.

A second kind of S-RAM PUFs is constructed with Dual Port RAM. By writing at the same time different information on both ports, i.e., challenging the RAM with the different information, the memory cell is brought into an undefined state, which shows a PUF-like behavior.

Due to unavoidable variations during production, the configuration of the components of an SRAM relative to each other is at least slightly random. These variations are reflected, e.g., in a slightly different threshold voltage of the transistors in the memory cells of the SRAM. When the SRAM is read out in an undefined state, e.g., before a write action, the output of the SRAM depends on the random configuration. Producing a new SRAM, with the same characteristic behavior requires producing an SRAM with the same configuration, a configuration which was achieved randomly. As this is unfeasible, the SRAM is unclonable as a physical system, that is, it is a PUF.

A further example of PUFs is the so-called Butterfly PUF. The Butterfly PUF comprises a plurality of butterfly PUF cells. A butterfly PUF cells comprises a cross-coupling of two latches or flip-flops. The butterfly PUF can be implemented on a Field Programmable Gate Array (FPGA), even if the FPGA does not comprise SRAM. The butterfly PUF cell can be viewed as a simulation of an SRAM memory cell using elements that are available on an FPGA. The way a butterfly operates is also similar to that of the SRAM. The butterfly PUF is also able to extract secrets from the complex physical characteristics of the integrated circuits on which it is implemented. Butterfly PUFs are explained more fully in the following paper: Sandeep S. Kumar, Jorge Guajardo, Roel Maes, Geert-Jan Schrijen, Pim Tuyls, "The butterfly PUF protecting IP on every FPGA,", pp. 67-70, 2008 IEEE International Workshop on Hardware-Oriented Security and Trust, 2008. The butterfly PUF is also described in the international patent application "identification of devices using physically unclonable functions", published as WO2009/024913, and incorporated herein by reference. See in particular FIGS. 8 and 10, and the corresponding description.

Additionally, the start-up behavior of Flip-Flops may be used as a PUF. Each flip-flop provides one bit of PUF data. Multiple flip-flops are needed to provide the number of bits needed after correction by helper data. For example, the number of needed bits may correspond to the number of bits of a cryptographic key.

European patent application EP0313967, "Authentication method for a data carrier with integrated circuit" describes how the differing programming times of storage cells in an E2-PROM can be used as a PUF. Yet a further type of PUFs are so-called delay PUFs. A delay PUF comprises one electronic wire. The precise delay characteristic of the wire is indicative for the response of the PUF.

One application of PUFs is to derive a cryptographic key on an electronic circuit. The electronic circuit typically includes an integrated Circuit (IC) and/or programmable logic. The programmable logic comprises, e.g., a field-programmable gate array (FPGA), a programmable logic device (PLD), or a digital signal processor (DSP), a microprocessor, etc. Instead of storing the cryptographic key in a non-volatile memory of some kind, the key is generated from the PUF only when the key is needed by the device. The key can be deleted when it is no longer needed. The next time the key is needed, it can be derived again from the PUF. Since the PUF may not give the exact same result when the same challenge is evaluated twice, a so-called Helper Data algorithm, also known as a Fuzzy Extractor, may be used to ensure that the key will be the same, each time it is derived. One way of using helper data to construct reproducible values from noisy measurements is described, e.g., in international patent application WO 2006/129242, "Template Renewal in Helper Data Systems", which is included herein by reference. Known systems that use a PUF to create a cryptographic key do not use the key for encrypting communication.

One way to use a PUF to create a cryptographic key is as follows. First, during an enrollment phase, a challenge-response pair is created. Then, using the fuzzy extractor, helper data is created. On the device, the challenge and the helper data are stored in a non-volatile memory. To derive the cryptographic key, a new response is obtained by evaluating the PUF for the challenge again. By combining the new response with the stored helper data, according to a helper data algorithm, a key is derived. The helper data ensures that the key is the same, each time it is derived. A fuzzy extractor is sometimes also referred to as a shielding function.

Helper Data

Helper data is data that is created from a first PUF response and a particular data item so that later the particular data may be exactly reconstructed from a second PUF response and the helper data, even though the first and second PUF response may differ slightly. The differences in the second response compared with the first response may be called 'errors'. The helper data can be regarded as error correcting data, in the sense that it corrects for errors in the second response. The function of helper data can encompass more than mere error correcting. For example, together with correcting errors in the second response the helper data can map the response to a predetermined data item, e.g., key. The first response may be called the enrollment response. The second response maybe called the construction response. If the PUF allows multiple inputs, then the first and second responses are typically taken for the same input, i.e., challenge.

There exists a number of ways to create helper data. Using helper data only a limited number of errors can be corrected. How many errors can be corrected depends on the type of helper data and the parameters used during the construction of the helper data.

The data item may be a cryptographic key or the enrollment response itself. The general concept of computing helper data for the purpose of reconstructing the data item is known to persons skilled in the art.

For example, international patent application published under WO 2006/053304 describes how helper data may be computed and how the enrollment response may be reconstructed; see for example, FIG. 3 and the accompanying description. This patent application also gives more details on how keys may be derived from an enrollment response.

The construction and use of helper data is described more fully in, for example, J. P. Linnartz, P. Tuyls, 'New Shielding Functions to Enhance Privacy and Prevent Misuse of Biometric Templates', In J. Kittler and M. Nixon, editors, Proceedings of the $3^{rd}$ Conference on Audio and Video Based Person Authentication, volume 2688 of Lecture Notes in Computer Science, pages 238-250, Springer-Verlag, 2003 and Y. Dodis et al, 'Fuzzy extractors: How to generate strong keys from biometrics and other noisy data', Advances in cryptology—Eurocrypt 2004, Ser. LNCS, C. Cahin and J. Camenisch, Eds., vol. 3027. Springer-Verlag, 2004, pp. 523-540. In this respect, further reference is made to published patent EP1922730 B1, with title "Information carrier authentication with a physical one-way function", incorporated herein by reference.

For example, consider a PUF whose responses are bit-strings, or whose responses may be converted to bit-strings. For example, the start-up values in an SRAM can be regarded as a PUF with a bit-string response. One way of creating helper data is as follows. An error correcting code, e.g., a BCH code can be selected with a word size larger than the number of bits in the PUF-response. A desired data item is converted into a code word of the error correcting code. Note that possibly multiple code words may be needed. An enrollment response of the PUF is XOR-ed with the code word and the result is stored, e.g., in a memory. Later the PUF is challenged again to obtain the construction response. The enrollment and construction response should typically differ in fewer bits than the number of errors that the error correcting code can correct. Depending on the application, a certain probability that the number of errors is too large to be corrected may be tolerated. The construction response is XOR-ed with the helper data, to obtain a code word having errors. Note that if there were errors in the construction response, than these will also be present in the code word having errors. The code word having errors is corrected using an error correcting algorithm corresponding to the code, e.g., using the BCH algorithm. From the resulting corrected code word, the data item can be extracted. Other error correcting codes, which may be used to create helper data, include Reed Muller, Golay, Repetition code, etc.

At the heart of a PUF is a physical system which generates values that depend on its physical embodiment, supporting algorithms, such as error correction, helper data generation etc, may be implemented in software, dedicated hardware, or a combination thereof.

A First Embodiment

FIG. 1 illustrates, in schematic form, a first embodiment 310 of a distribution system according to the invention for distributing digital information. Some of the data dependencies between the modules are indicated with arrows.

System 310 comprises a server 200 and a computing device 100. For example, the server may comprise a content and/or software server. The computing device 100 may comprise a set-top box, a mobile phone etc. The invention may be used with computing devices that comprise a security module for securely performing security sensitive operations. Such a security module may be embodied in a smart card.

Server 200 comprises a communication module 210 and computing device 100 comprises a communication module 110 for mutual communication with each other. For example, communication module 210 may comprise a smart card reader and computing device 100 may be embodied in a smart card comprising connector pads for communication with the smart card reader. Communication module 210 may comprise a data network module, e.g., an Ethernet card, to communicate with computing device 100 through a data network, e.g., an Ethernet, the Internet, etc. communication module 210 may comprise an antenna for wireless communication with computing device 100. The communication between computing device 100 and server 200 may proceed over various different communication types. For example, in case computing device 100 is embodied in a smart card, the communication to server 200 may flow via a smart card reader, an ADSL modem, an Internet router, etc.

Server 200 comprises an encryption module 220 for encrypting the digital information before transmission to computing device 100. Computing device 100 comprises a decryption module 120 for decrypting the encrypted digital information after it is received from server 200. Many suitable encryption schemes exist for securing the communication between computing device 100 and server 200. For example, they may employ symmetric encryption, wherein the encryption and decryption keys are equal, or at least wherein the decryption key is derivable from the encryption key without inordinate amounts of computing resources. Examples thereof include block ciphers, e.g., the AES block cipher and stream ciphers, e.g., RC4. For AES, any 128-bit key string can be used as encryption key. For AES, the corresponding decryption key is equal to the encryption key. Keys for symmetric encryption can typically be chosen at random.

For example, server 200 may employ asymmetric encryption, also known as public-key cryptography, wherein the encryption and decryption keys are unequal. One cannot derive the decryption key from the encryption key. Examples thereof include RSA encryption.

Encryption module 220 and/or decryption module 120 may be implemented in software, hardware or in a combination thereof. Encryption and decryption functionality is particularly well suited for implementation in hardware, as it typically requires a low gate count compared to the amount of computing cycles they require.

Server 200 comprises storage for storing at least part of the digital information which is to be sent to computing device 100. Encryption module 220 needs an encryption key for encryption of the digital information. Below we will detail a number of ways in how server 200 and in particular, encryption module 220 may obtain the encryption key.

Computing device 100 comprises a physically unclonable function 150. For example, any suitable physically unclonable functions may be used, in particular one that is described above. For PUF 150 a SRAM PUF may be used. This has at least two advantages. First of all SRAM PUFs are comparatively low-cost compared to some of the alternatives. Moreover, SRAM is often already available on computing devices, in particular smart cards, for other reasons. Preferably, PUF 150 is integrated in computing device 100. This has the advantage that eavesdropping on the communication between PUF 150 and other components of computing device 100 is harder.

Computing device 100 comprises a cryptographic key module 170. Cryptographic key module 170 is configured to obtain the encryption and decryption key. The decryption key is used during enrollment to determine the helper data. Cryptographic key module 170 may simply choose the keys randomly. Cryptographic key module 170 may also determine key in dependency on the first response. If the device does not have access to a random number generator then the latter has the advantage that the keys contain at least some of the entropy present in the PUF, making them less predictable. Computing device 100 comprises an enrollment module 130. Enrollment module 130 is configured to obtain a first response from PUF 150, sometimes called the enrollment response. Since PUFs often have some variability in their responses, a cryptographic key cannot directly be derived from them. However, using helper data it is possible to correct for the variances between the first and second response.

The functions of cryptographic key module 170 and enrollment module 130 may be combined. For example, the encryption key may be a hash of the first response and the helper data may comprise the parity bits of a codeword, wherein the data bits are the first response. When a second response is obtained, it is corrected using the parity bits, and next the key is recovered using the has function. In this example, the encryption key and decryption key are equal.

Another possibility is as follows, a public-private encryption key pair is selected, say for RSA. The private key is encoded as a code word of a code with sufficiently long code words. The helper data is taken as the XOR between the code word and the first response. When a second response is obtained, it is XOR-ed with the helper data and corrected as if it were a damaged code word. The resulting codeword is decoded so that the private key is obtained. In this example, the public and private keys are different. Note that this mechanism is also suitable for symmetric encryption.

The helper data is typically not needed immediately after its generation, but later when the encrypted digital information is received in the computing device. The helper data may be stored in a long-term storage of the computing device, helper data store 160, e.g., a non-volatile memory, such as a flash memory. Alternatively, the helper data is sent to server 200 for storage. Later when the server sends a message, encrypted with the encryption key, the helper data may be send with it.

In operation, the system may work as follows. First, there is an enrollment phase: enrollment module 130 obtains a first response from PUF 150. For example, enrollment module 130 reads out a memory after boot-up of computing device 100. Cryptographic key module 170 generates an encryption and decryption key pair. The decryption key and first response is used by enrollment module 130 to create helper data. The helper data may be stored in helper data store 160. After the helper data has been created, the decryption key is erased from the computing device. After the encryption key has been sent to the server, the encryption key is erased from the computing device.

The encryption key is sent to server 200 using communication modules 110 and 210. Before sending the encryption key, a session key is negotiated between computing device 100 and server 200, e.g., using a version of Diffie-Hellman. Note, that this session key is preferably not stored after it has been used for the transmission. In addition to the encryption key, the helper data may also be sent to server 200 to for storing at the server, instead of storing the helper data at the computing device. The helper data may be sent in plain format to server 200, nevertheless it is preferred to protect this transmission, e.g., using the same session key as the encryption key. This ends the enrollment phase.

Later, server 200 may need to use the encryption key, for example, because the other security measures of server 200 are compromised. This starts the reconstruction phase. Server 200 encrypts a message with the encryption key, using encryption module 220. The encryption key has been stored at server 200 in some kind of long-term storage (not shown). The encrypted message is received at the computing device by communication module 110. Reconstruction module 140 obtains a second response from PUF 150. Preferably, the first and second response for a large part equal, the minimum allowable overlap depends on the helper data, i.e., the number of errors that the helper data can correct. The overlap should be larger than 50%. Preferably, the first and second response comprise so few differences that the helper data has a manageable size compared to the size of other messages employed in the system, the bandwidth available, the latency requirements, etc.

Reconstruction module 140 also obtains the helper data, say from helper data store 160. From the helper data and the second response, reconstruction module 140 reconstructs the decryption key. The reconstruction may comprises applying an error correcting algorithm on the second response using error correcting data comprised in the helper data. This end the reconstruction phase.

With the decryption key, decryption module 120 decrypts the message. Computing device 100 processes the decrypted message, e.g., updates keys, programming etc.

An attacker, who obtains the helper data, the programming and data of computing device 100, but who has no control over computing device 100, in particular no access to PUF 150, more in particular no access to responses of PUF 150, cannot obtain the decryption key. Messages send to computing device 100 encrypted with that key cannot be read by the attacker. This allows secure updating of computing device 100. A compromised device is again useable in the intended secure manner.

A Second Embodiment

Figure 2:
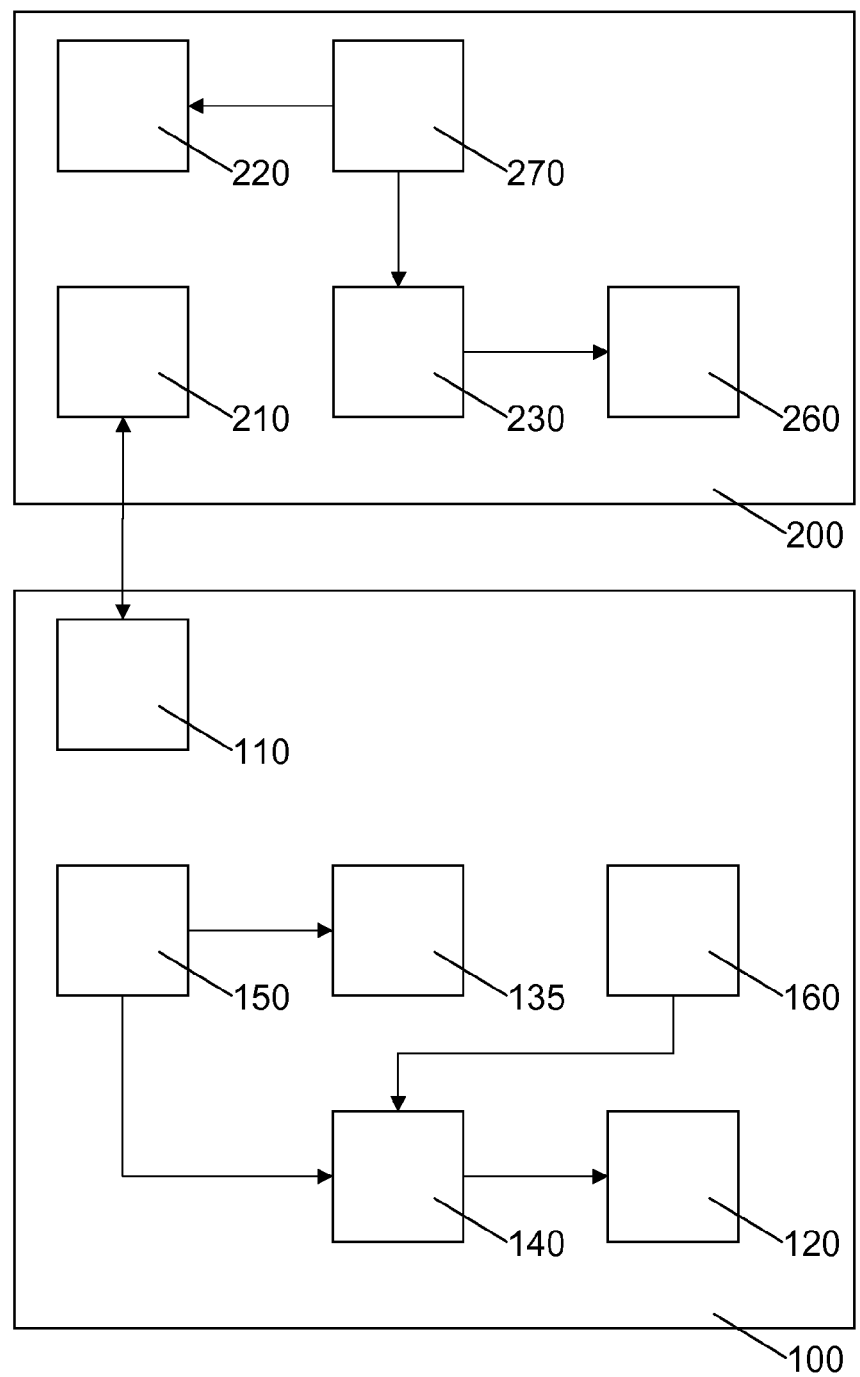
FIG. 2 is a block diagram illustrating a second embodiment of the distribution system for distributing digital information according to the invention.

FIG. 2 illustrates, in schematic form, a second embodiment 320 of a distribution system according to the invention for distributing digital information. This embodiment contains many of the components of system 310 but in a different configuration.

Distribution system 320 comprises computing device 100 and server 200. Computing device 100 comprises communication module 110, PUF 150, reconstruction module 140, helper data store 160, and decryption module 120. Computing device 100 does not comprise enrollment module 130 and cryptographic key module 170. Instead, computing device 100 comprises a first response module 135. First response module 135 is configured to obtain the first response from PUF 150 and send it to server 200.

Server 200 comprises an 210 and encryption module 220. In addition, server 200 comprises an enrollment module 230, cryptographic key module 270 and helper data store 260.

The operation of the system can be divided in an enrollment phase and a reconstruction phase. In the enrollment phase, first response module 135 obtains the first response from PUF 150. The first response is sent to server 200 via communication module 110 and 210. After the first response has been sent to server 200, the first response is erased at the computing device. The first response may be encrypted using a session key. The first response is received at server 200. In server 200 an encryption and decryption key are selected by key module 270. Server 200 has the option of using the same encryption key for more than one computing device. Enrollment module 230 computes the helper data based on the decryption key and the first response. The helper data may be stored at helper data store 260. The helper data can be kept at server 200 for a time when the decryption key is needed. The helper data can also be send to computing device 100 for storage over there in helper data store 160. When the server 200 performs this method with multiple computing devices it may be advantageous to spread the sending of the helper data over time to reduce bandwidth requirements. In this way, the helper data is available at all or most computing devices 100 by the time the helper data is needed there, but it is avoided to send all helper data in one batch. This end the enrollment phase.

Later when the encryption key is needed, say after a breach of the security of computing device 100, encryption module 220 encrypts a message with the encryption key. The encrypted message is sent to computing device 100. If computing device 100 does not yet have access to the helper data, then server 200 also sends the helper data to computing device 100. Computing device 100 may store the helper data in helper data store 160. Reconstruction module 140 obtains a second response from PUF 150 and the helper data to reconstruct the decryption key.

The use of key-negotiation and session keys for the encryption of the encryption key or helper data may be avoided if the communication is performed in a secure location, e.g., the manufacturing plant.

Figure 3A:
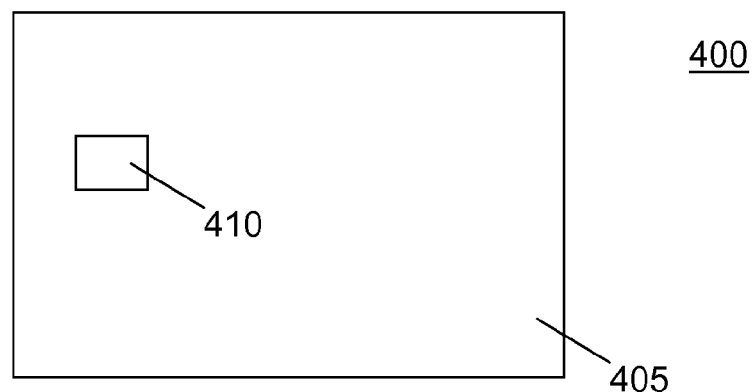
FIG. 3a shows a schematic top-view of a smart card.
Figure 3B:
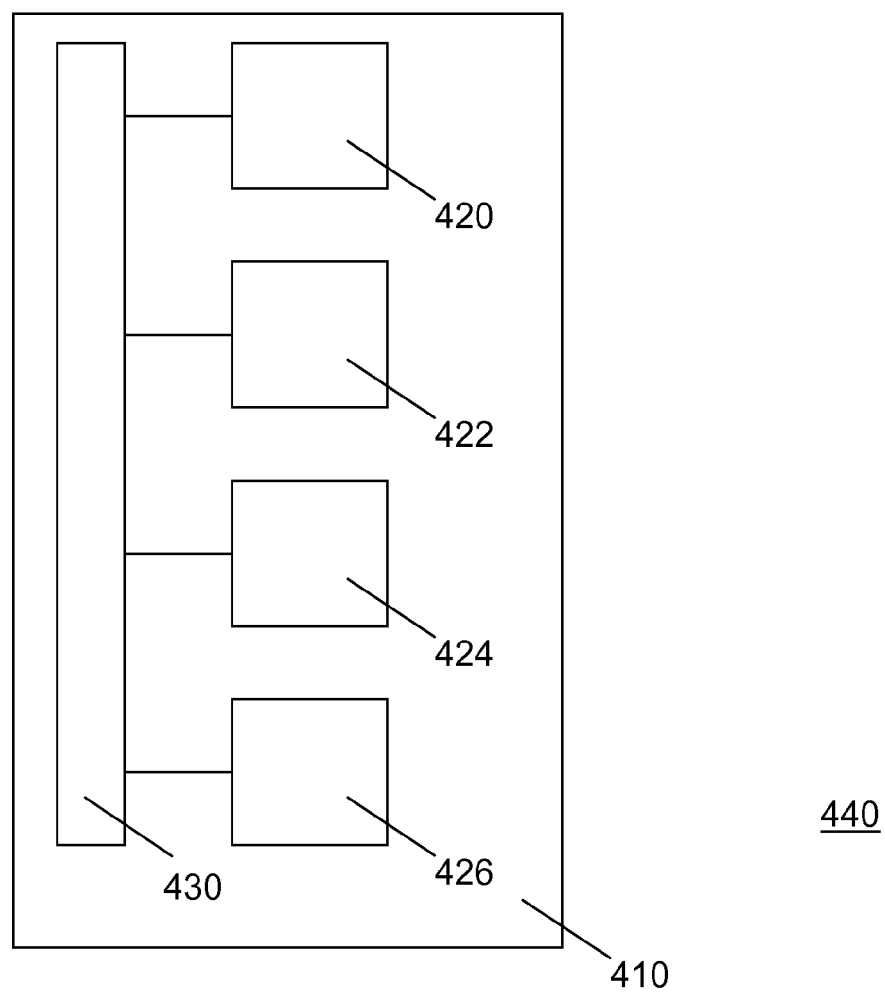
FIG. 3b is a block diagram illustrating an integrated circuit.

FIG. 3a shows in top-view a schematic representation of a smart card 400 according to the invention. The smart card comprises an integrated circuit 410 and a, typically plastic, card 405 supporting integrated circuit 410. The architecture of integrated circuit 410 is schematically shown in FIG. 3b. Circuit 410 comprises a processing unit 420, e.g. a CPU, for running computer program components to execute a method according to the invention and/or implement its modules. Circuit 410 comprises a memory 422 for storing programming code, data, cryptographic keys, helper data etc. Part of memory 422 may be read-only. Part of memory 422 may be high security memory, e.g., fuses for storing security related data, e.g., keys. Circuit 410 comprises a physically unclonable function 424. Physically unclonable function 424 may be combined with memory 422. Circuit 410 comprises a communication element 426, e.g., an antenna, connector pads or both. Circuit 410, memory 422, PUF 424 and communication element 426 may be connected to each other via a bus 430. The card may be arranged for contact and/or contact-less communication, using an antenna and/or connector pads respectively. The smart card may be used, e.g., in a set-top box to control access to content, in a mobile phone to control access to a telecommunication network, in a public transport system to control access to public transport, in a banking card to control access to a bank account, etc.

The smart card may use a non-memory based PUF, for example, a delay PUF.

Figure 4:
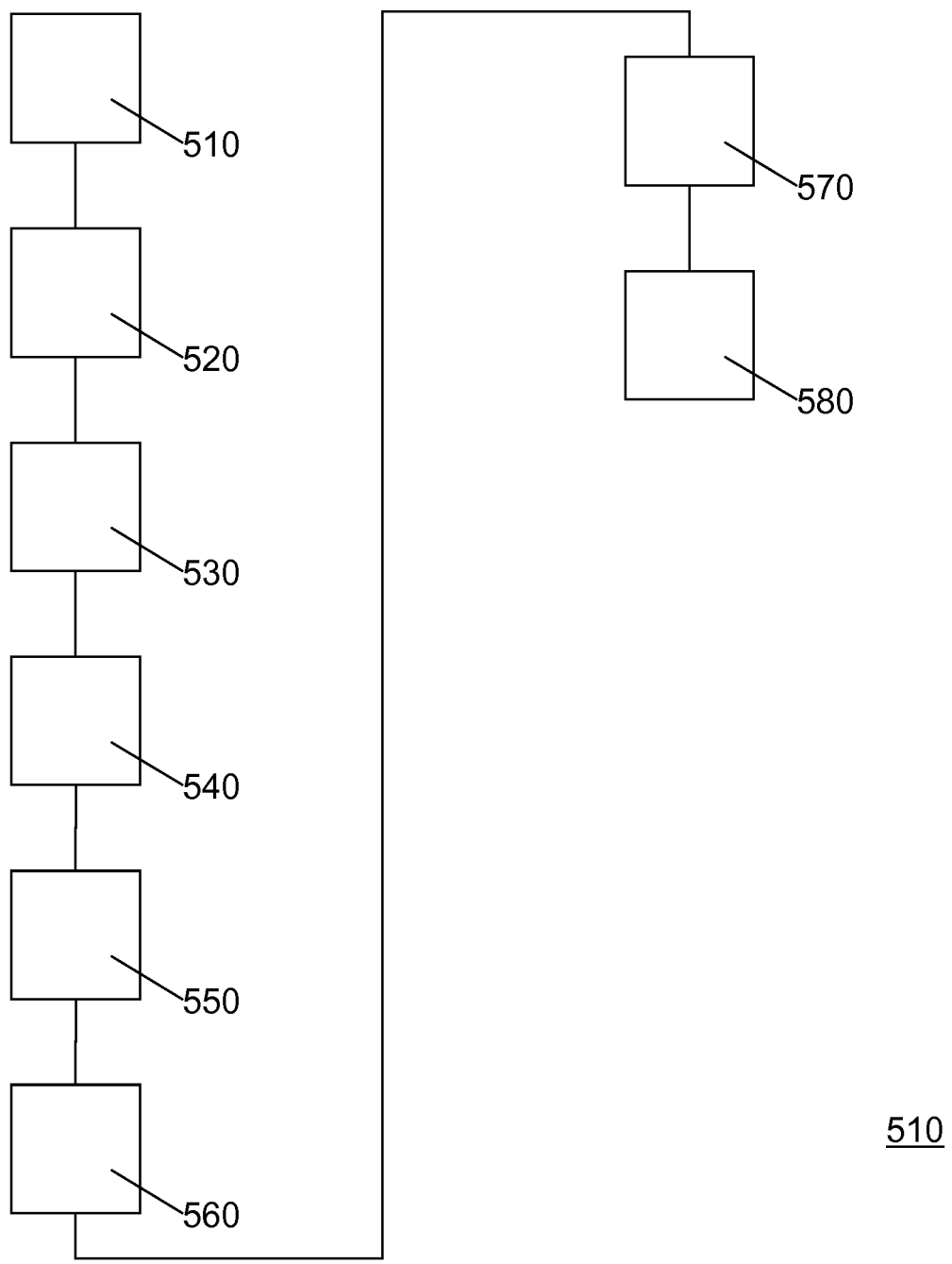
FIG. 4 is a flow chart illustrating a first embodiment of a method according to the invention.
Figure 5:
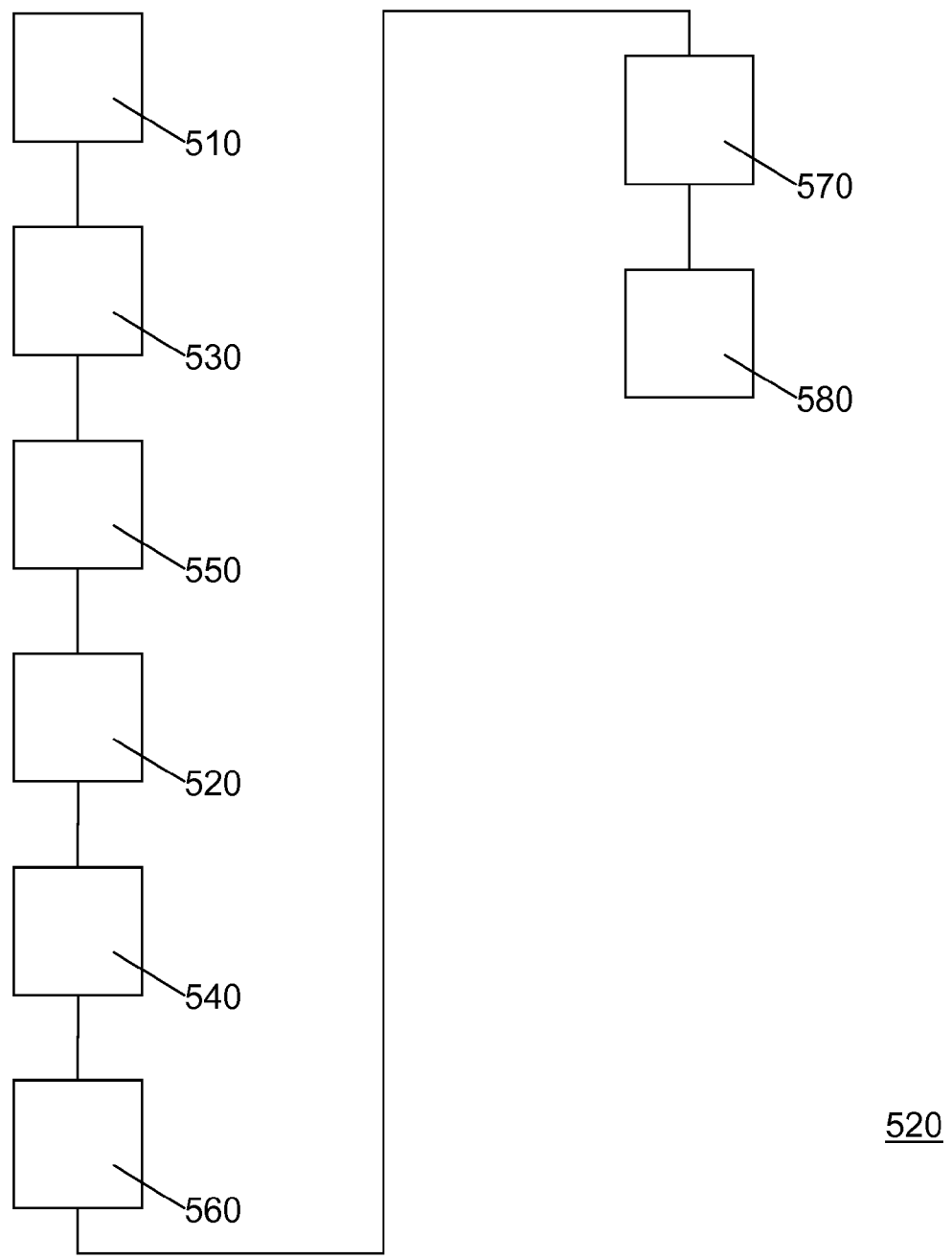
FIG. 5 is a flow chart illustrating a second embodiment of a method according to the invention.

FIGS. 4 and 5 show flow-chart illustrating a method 510 and 520 respectively. One possible order of executing the steps of the method is given in the figures, but is noted that variations are possible. The methods have an enrollment phase and a reconstruction phase.

The enrollment phase of method 510 comprises: optionally sending a patch 510, e.g., a software patch, from the server to the computing device to extend the computing device with the functionality needed to perform and/or partake in a method according to the invention; obtaining, e.g., selecting, an encryption and decryption key 520; obtaining a first response from a physical unclonable function 530; determining helper data from the decryption key and the first response 540; sending an enrollment message from the computing device to the server 550. If the encryption and/or decryption key were stored, it is preferred to erase them. The enrollment method that is sent in method 510 comprises the encryption key.

The order of the steps may be varied. For example, step 550 may be performed at any point before step 560 and after step 520, possibly in parallel to other steps as long as the enrollment message is sent before the security of the computing device is breached. Steps 520 and 530 may be interchanged.

The enrollment phase of method 520 comprises: optionally sending a patch 510; obtaining a first response from a physical unclonable function 530; sending an enrollment message from the computing device to the server 550; obtaining, e.g., selecting, an encryption and decryption key 520; determining helper data from the decryption key and the first response 540. If the first response was stored, then it is preferred to erase it. The enrollment method that is sent in method 520 comprises the first response.

The reconstruction phases of methods 510 and 520 each comprises; encrypting at the server the digital information with a cryptographic encryption key 560; reconstructing at the computing device the decryption key from the second response and the helper data 570; decrypting at the computing device the encrypted digital information with a cryptographic decryption key corresponding to the encryption key 580.

If in between an enrollment phase and a reconstruction phase the data and/or programming stored at the computing device is revealed, the security of the computing device may still be recovered. From its private access to the physically unclonable function a new decryption key can be derived which allows encrypted and/or authenticated communication from the server to the computing device.

Many different ways of executing the method are possible, as will be apparent to a person skilled in the art. For example, the order of the steps can be varied or some steps may be executed in parallel. Moreover, in between steps other method steps may be inserted either. The inserted steps may represents refinements of the method such as described herein, or may be unrelated to the method. Moreover, a given step may not have finished completely before a next step is started.

A method according to the invention may be executed using software, which comprises instructions for causing a processor system to perform method 500. Software may only include those steps taken by the server or the computing device during the enrollment and/or the reconstruction phase.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. It will also be appreciated that such a program may have many different architectural designs. For example, a program code implementing the functionality of the method or system according to the invention may be subdivided into one or more subroutines. Many different ways to distribute the functionality among these subroutines will be apparent to the skilled person. The subroutines may be stored together in one executable file to form a self-contained program. Such an executable file may comprise computer executable instructions, for example, processor instructions and/or interpreter instructions (e.g. Java interpreter instructions). Alternatively, one or more or all of the subroutines may be stored in at least one external library file and linked with a main program either statically or dynamically, e.g. at run-time. The main program contains at least one call to at least one of the subroutines. The subroutines may also comprise function calls to each other. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth. These instructions may be subdivided into subroutines and/or be stored in one or more files that may be linked statically or dynamically.

The carrier of a computer program may be any entity or device capable of carrying the program. For example, the carrier may include a storage medium, such as a ROM, for example a CD ROM or a semiconductor ROM, or a magnetic recording medium, for example a floppy disc or hard disk. Furthermore, the carrier may be a transmissible carrier such as an electrical or optical signal, which may be conveyed via electrical or optical cable or by radio or other means. The software may be sent as a signal along a wire, or wireless, or using a data network. The program may be made available on a server for download and/or remote usage over a data network, such as the Internet. When the program is embodied in such a signal, the carrier may be constituted by such cable or other device or means. Alternatively, the carrier may be an integrated circuit in which the program is embedded, the integrated circuit being adapted for performing, or for use in the performance of, the relevant method.

A method and/or apparatus according the invention, or a suitable part thereof, may be embedded in configuration data, e.g. a bitstream, to be loaded into a field programmable gate array (FPGA).

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A distribution system for distributing digital information comprising a server and a computing device, the server and computing device each comprising a communication module for communication between the server and the computing device, the server comprising an encryption module for encrypting the digital information with a cryptographic encryption key, the computing device comprising a decryption module for decrypting the encrypted digital information with a cryptographic decryption key corresponding to the encryption key, the system comprises a cryptographic key module for obtaining the encryption and decryption key, wherein the computing device comprises an integrated physically unclonable function, the computing device being configured for
obtaining a first response from the physically unclonable function before a security breach has occurred that revealed data and/or programming code of the computing device, and for
sending the server an enrollment message comprising the first response, the server comprises the cryptographic key module and an enrollment module for determining helper data from the decryption key and the first response obtained from the physically unclonable function to enable later reconstruction, after the security breach has occurred, of the decryption key from the helper data and a second response obtained from the physically unclonable function, the computing device comprises a reconstruction module for reconstructing the decryption key from the second response and the helper data, and the server is configured for encrypting the digital information with the cryptographic encryption key and for sending the helper data to the computing device after the security breach has occurred.

2. A distribution system for distributing digital information as in claim 1, wherein the digital information comprises an update message for updating functionality of the computing device, the update message comprising any one of an new key for replacing a compromised key of the computing device, and additional programming for improving the programming of the computing device.

3. A distribution system for distributing digital information as in claim 1, wherein the computing device does not store the encryption key and does not store the decryption key before the computing device receives the digital information encrypted with the encryption key.

4. A distribution system for distributing digital information as claim 1, wherein the computing device comprises a key storage for storing a content decryption key for use in decrypting encrypted content, wherein the digital information comprises a further content decryption key for replacing the content decryption key.

5. A distribution system as in claim 1 wherein a memory of the computing device is used as the physically unclonable function, the memory comprising a plurality of writable memory locations each memory location having at least two possible logical states, and an input for receiving an activation signal so as to cause each of said memory locations to enter one of its possible logical states, the entered state being dependent on physical, at least partially random characteristics of said memory, and thereby generating a response pattern of logical states useful as the enrollment response and as the construction response.

6. A distribution system as in claim 1 wherein the memory of the computing device used as the physically unclonable function comprises any one of: SRAM, flip-flops, registers, and DRAM.

7. A server for use in a distribution system as in claim 1, comprising
a communication module for communication between the server and a computing device, the computing device comprising an integrated physically unclonable function,
a cryptographic key module for obtaining and encryption and decryption key,
an enrollment module for determining helper data from the decryption key and the first response obtained from the physically unclonable function to enable later reconstruction, after the security breach has occurred, of the decryption key from the helper data and a second response obtained from the physically unclonable function, and
an encryption module for encrypting the digital information with a cryptographic encryption key, the server is configured for encrypting the digital information with the cryptographic encryption key after the security breach has occurred.

8. A computing device for use in a distribution system as in claim 1, the computing device comprising
a communication module for communication between a server and the computing device,
a decryption module for decrypting encrypted digital information with a cryptographic decryption key corresponding to an encryption key,
an integrated physically unclonable function, the computing device being configured for obtaining a first response from the physically unclonable function before a security breach has occurred that revealed data and/or programming code of the computing device, and
a reconstruction module for reconstructing, after the security breach has occurred, of the decryption key from the helper data and a second response obtained from the physically unclonable function.

9. A computing device as in claim 8, wherein the computing device is embedded in a set-top box comprising a conditional access module, the conditional access module comprising a key storage for storing a content decryption key for use in decrypting encrypted content,
wherein
the digital information comprises a further content decryption key for replacing the content decryption key.

10. A computing device as in claim 8 embodied in any one of a smart card, RFID tag, FPGA, DSP, mobile phone, telecom device, and a router.

11. A distribution method for distributing digital information from a server to a computing device comprising communicating between the server and the computing device, encrypting at the server the digital information with a cryptographic encryption key, decrypting at the computing device the encrypted digital information with a cryptographic decryption key corresponding to the encryption key, and obtaining the encryption and decryption key,
wherein the method comprises obtaining a first response from a physically unclonable function of the computing device before a security beach has occurred that revealed data and/or programming code of the computing device, sending a server an enrollment message comprising the first response, determining helper data from the decryption key and the first response obtained from a physically unclonable function integrated in the computing device to enable later reconstruction, after the security breach has occurred, of the decryption key from the helper data and a second response obtained from the physically unclonable function, sending the helper data to the computing device after the security breach has occurred, and reconstructing at the computing device the decryption key from the second response and the helper data, wherein the encrypting at the server of the digital information with the cryptographic encryption key is performed after the security breach has occurred that revealed data and/or programming code of the computing device.

12. A distribution method for distributing digital information as in claim 11 comprising sending a patch from the server to the computing device, the patch updating parameters of the computing device which determine a functionality of the computing device, the updated functionality comprising at least the functions of obtaining the first response from the integrated physically unclonable function.

13. A distribution method for distributing digital information as in claim 12 wherein the updated functionality further comprises obtaining at the computing device a further response from the physically unclonable function and reconstructing the decryption key based on the further response.

14. A non-transitory computer readable medium embodying a computer program comprising computer program code means adapted to perform the server and/or the computing device steps of a method according to any one of claim 13, when the computer program is run on a computer.

15. A distribution method for distributing digital information as in claim 12, wherein the patch updates software code.

16. A non-transitory computer readable medium embodying a computer program comprising computer program code means adapted to perform the server and/or the computing device steps of a method according to any one of claim 12, when the computer program is run on a computer.

17. A non-transitory computing readable medium embodying a computer program comprising computer program code means adapted to perform the server and/or the computing device steps of a method according to claim 11, when the computing program is run on a computer.

* * * * *